US011718177B2

(12) United States Patent
Jahns et al.

(10) Patent No.: US 11,718,177 B2
(45) Date of Patent: Aug. 8, 2023

(54) INSTRUMENT CLUSTER WITH A CONTEXTUAL VIEW

(71) Applicant: PACCAR Inc, Bellevue, WA (US)

(72) Inventors: Steven Karl Jahns, Bellingham, WA (US); Ryan Anthony Reed, Kenmore, WA (US); Jonathan Scott Duncan, Seattle, WA (US); Josef Lotz, Pune (IN); Kevin James Allen, Bow, WA (US); Jerrold Adam Regan, Sedro-Woolley, WA (US); Christina Nenke, Muehlheim (DE); Marc George Wilczak, Lake Balboa, CA (US); Nicole Johnson, West Los Angeles, CA (US)

(73) Assignee: PACCAR, Inc., Bellevue, WA (US)

( * ) Notice: Subject to any disclaimer, the term of this patent is extended or adjusted under 35 U.S.C. 154(b) by 114 days.

(21) Appl. No.: 17/067,408

(22) Filed: Oct. 9, 2020

(65) Prior Publication Data

US 2021/0237573 A1 Aug. 5, 2021

Related U.S. Application Data

(60) Provisional application No. 62/978,691, filed on Feb. 19, 2020, provisional application No. 62/978,698, (Continued)

(51) Int. Cl.
*B60K 35/00* (2006.01)
*G09G 5/14* (2006.01)

(52) U.S. Cl.
CPC ............... *B60K 35/00* (2013.01); *G09G 5/14* (2013.01); *B60K 2370/1523* (2019.05);
(Continued)

(58) Field of Classification Search
CPC ............ B60K 35/00; B60K 2370/1523; B60K 2370/166; B60K 2370/167;
(Continued)

(56) References Cited

U.S. PATENT DOCUMENTS 9,254,750 B2 * 2/2016 Tarte ...................... B60K 37/06
9,457,665 B1 * 10/2016 Boss ...................... H04N 5/225
(Continued)

*Primary Examiner* — Brent D Castiaux
(74) *Attorney, Agent, or Firm* — Merchant and Gould, PC

(57) ABSTRACT

Systems, methods and computer readable storage media provide a flexible and variability-accommodating instrument cluster for display on an in-vehicle screen and a user experience interaction model for providing dynamic driving-context-relevant information via the instrument cluster. The instrument cluster may be shown in a contextual content view, wherein the contextual content view may include a one or more gauges and/or messaging that are determined to be relevant to a determined contextual state of the vehicle. The contextual state of the vehicle may be determined based on signaling data provided by a plurality of data sources, wherein the signaling data may indicate one or a combination of conditions associated with the contextual state. The instrument cluster may be dynamically updated to display the driving-context-relevant information when the contextual state is detected.

20 Claims, 11 Drawing Sheets

Related U.S. Application Data filed on Feb. 19, 2020, provisional application No. 62/970,512, filed on Feb. 5, 2020, provisional application No. 62/970,470, filed on Feb. 5, 2020.

(52) U.S. Cl.
CPC .. *B60K 2370/166* (2019.05); *B60K 2370/167* (2019.05); *G09G 2354/00* (2013.01); *G09G 2370/20* (2013.01); *G09G 2380/10* (2013.01)

(58) Field of Classification Search
CPC ........ B60K 2370/113; B60K 2370/137; B60K 2370/151; B60K 2370/1515; B60K 2370/155; B60K 37/02; B60K 37/06; G09G 5/14; G09G 2354/00; G09G 2370/20; G09G 2380/10; G06F 3/147; B60Y 2200/14
See application file for complete search history.

(56) References Cited

U.S. PATENT DOCUMENTS

| | | | |
|---|---|---|---|
| 2008/0211652 A1* | 9/2008 | Cope | B60K 35/00 340/461 |
| 2008/0224840 A1* | 9/2008 | Kawachi | B60K 35/00 340/441 |
| 2011/0209092 A1* | 8/2011 | Tarte | B60K 37/06 715/830 |
| 2021/0237572 A1 | 8/2021 | Jahns | |
| 2021/0237574 A1 | 8/2021 | Jahns | |
| 2021/0237576 A1 | 8/2021 | Jahns | |
| 2021/0239204 A1 | 8/2021 | Jahns | |

* cited by examiner

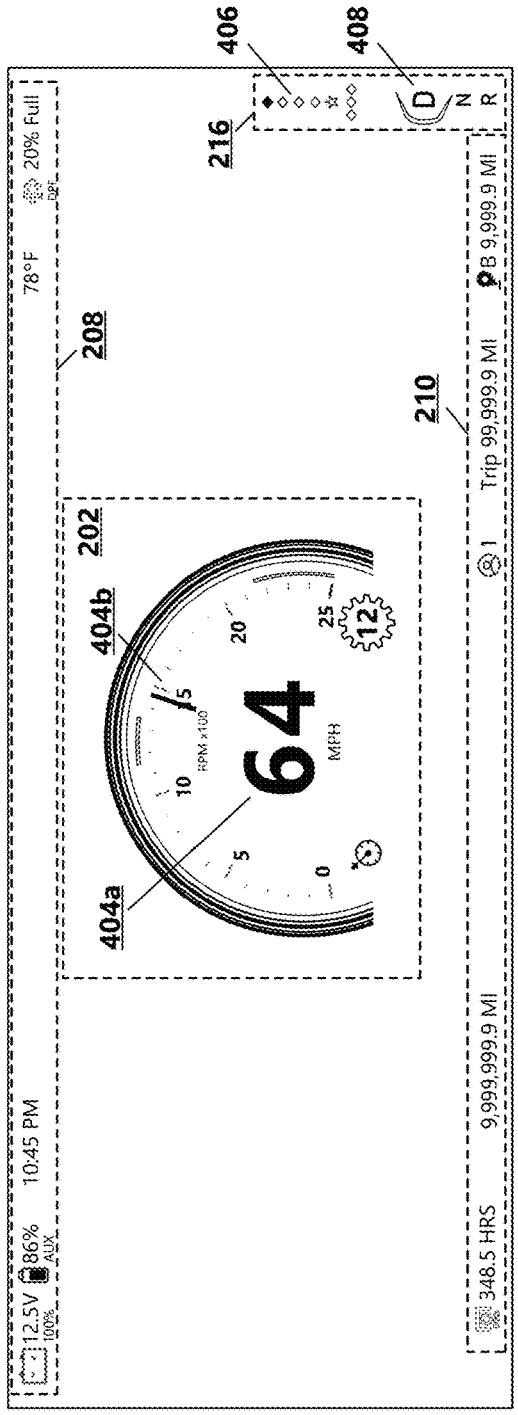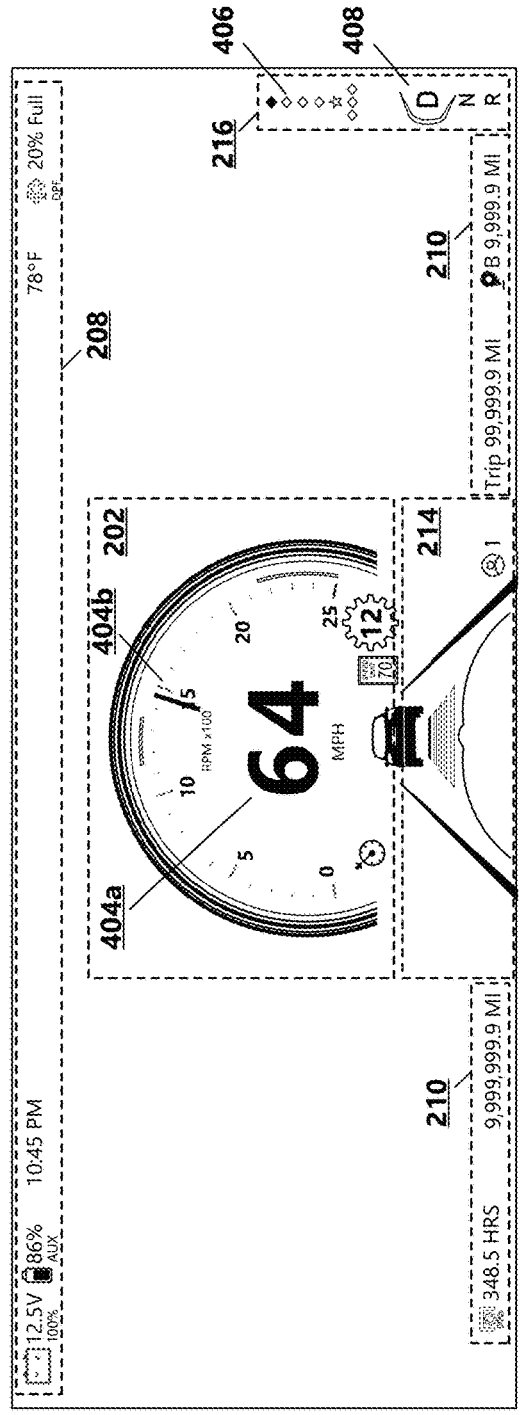

702a-n ↓ 802 ↙

804a-n →

| Conditions | Contextual States | | | | | | |
|---|---|---|---|---|---|---|---|
| | CS1 | CS2 | CS3 | CS4 | CS5 | ... | CSn |
| Condition A | x | | x | | | ... | x |
| Condition B | x | x | | | | ... | |
| Condition C | x | | x | | | ... | x |
| Condition D | | x | x | | x | ... | |
| Condition E | x | | | x | x | ... | x |
| Condition F | | x | | | x | ... | |
| ⋮ | ... | ... | ... | ... | ... | ... | ... |
| Condition n | | | x | | x | ... | |

| | DCRI | Contextual States | | | | | | |
|---|---|---|---|---|---|---|---|---|
| | | CS1 | CS2 | CS3 | CS4 | CS5 | ... | CSn |
| 810a | Gauge A | x | x | x | | x | ... | |
| 810b | Gauge B | x | | x | x | | ... | x |
| 810c | Gauge C | | x | | | | ... | |
| ⋮ | ⋮ | ... | ... | ... | ... | ... | ... | ... |
| 810n | Gauge n | | | x | | | ... | x |
| 704a | Message A | | x | | | x | ... | |
| 704b | Message B | x | | | x | | ... | |
| ⋮ | ⋮ | ... | ... | ... | ... | ... | ... | ... |
| 704n | Message n | | | x | | | ... | x |

FIG. 8B

INSTRUMENT CLUSTER WITH A CONTEXTUAL VIEW

CROSS-REFERENCE TO RELATED APPLICATIONS

This application claims the benefit of U.S. Provisional Application No. 62/970,512, having the title of "STATE BASED INFORMATION PRESENTATION SYSTEM" and the filing date of Feb. 5, 2020, U.S. Provisional Application No. 62/970,470, having the title of "DIESEL PARTICULATE FILTER PERCENTAGE GAUGE" and the filing date of Feb. 5, 2020, U.S. Provisional Application No. 62/978,691, having the title of "INSTRUMENT CLUSTER USER INTERFACE" and the filing date of Feb. 19, 2020, and U.S. Provisional Application No. 62/978,698, having the title of "INSTRUMENT CLUSTER USER INTERFACE" and the filing date of Feb. 19, 2020, which are incorporated herein by reference in their entireties.

BACKGROUND

Instrument clusters for vehicles typically have been mechanical analog gauges having a dial and a rotating needle that points to indicia printed on the dial to provide a driver with a visual indication of a measurement associated with a current status of the vehicle. For example, typically, the vehicle may be configured with physical gauges to inform the driver of information useful for operation of the vehicle. As can be appreciated, such a configuration of physical gauges may occupy valuable real estate space in the vehicle and can be distracting to the driver. For example, a number of gauges may show information that may not be relevant to the driver for the particular driving task at hand. Accordingly, gauges and other information that may be relevant and useful to the user for the particular driving task may not be displayed in such a way that the driver's attention may be easily drawn to the relevant and useful information. For example, the relevant and useful information may be lost amongst other gauges displaying information that may not be relevant or as useful to the driver at that time. The driver may be overloaded with available information; as such, the driver may be less aware and/or responsive to abnormal conditions that may necessitate the driver's attention.

It is with respect to these and other general considerations that embodiments have been described. While relatively specific problems have been discussed, it should be understood that the embodiments should not be limited to solving the specific problems identified in the background.

SUMMARY

The disclosure generally relates to systems, methods, and computer readable storage media for providing a flexible and variability-accommodating instrument cluster and user experience interaction model for displaying the instrument cluster on an in-vehicle screen. According to one aspect, the instrument cluster and user interaction model are implemented in a heavy truck. The interaction model may include adding and removing content included in the instrument cluster based on background logic processing that determines a current context of the vehicle based on various signals that indicate vehicle state, location, point in journey, etc. Various sensors may be utilized to provide signaling data that may be used to determine the contextual state of the vehicle and to further determine the set of information that may be relevant and useful to the driver based on the identified contextual state. When a contextual state is identified, the instrument cluster display may be transformed to display the relevant and useful information. For example, this allows the instrument cluster to display relevant information automatically, rather than requiring a driver to manually navigate to specific screen content. In some examples, a user may be enabled to customize content displayed in a contextual mode. By utilizing a digital display, the information presented to the driver may be dynamically streamlined to a situationally relevant set, thus helping to reduce driver distraction.

According to an aspect, a method is provided that provides context-relevant information in an instrument cluster for display on a screen in a vehicle, comprising: displaying the instrument cluster in a first content view of a set of content views; receiving an indication of a user selection to change the displayed first content view to a contextual content view; receiving signaling data from a plurality of data sources; evaluating the signaling data to determine whether a contextual state is associated with at least part of the signaling data; and in response to determining that at least part of the signaling data is associated with a contextual state, displaying the instrument cluster in the contextual view, wherein displaying the instrument cluster in the contextual view comprises displaying a set of driving-context-relevant information in the displayed instrument cluster based on the contextual state.

According to another aspect, a system is provided that is configured to provide context-relevant information in an instrument cluster for display on a screen in a vehicle. In an example embodiment, the system comprises at least one processor; a memory storage device including instructions that when executed by the at least one processor are configured to: display the instrument cluster in a first content view of a set of content views; receive an indication of a user selection to change the displayed first content view to a contextual content view; receive signaling data from a plurality of data sources; evaluate the signaling data to determine whether a contextual state is associated with at least part of the signaling data; and in response to determining that at least part of the signaling data is associated with a contextual state, display the instrument cluster in the contextual view, wherein in displaying the instrument cluster in the contextual view, the system is configured to display a set of driving-context-relevant information in the displayed instrument cluster based on the contextual state.

In another aspect, a computer-readable storage device is provided, wherein the computer-readable storage device includes computer readable instructions, which when executed by a processing unit, are configured to perform an embodiment of the method. In an example embodiment, the instructions are configured to provide one or a combination of: displaying the instrument cluster in a first content view of a set of content views; receiving an indication of a user selection to change the displayed first content view to a contextual content view; receiving signaling data from a plurality of data sources; evaluating the signaling data to determine whether a contextual state is associated with at least part of the signaling data; and in response to determining that at least part of the signaling data is associated with a contextual state, displaying the instrument cluster in the contextual view, wherein displaying the instrument cluster in the contextual view comprises displaying a set of driving-context-relevant information in the displayed instrument cluster based on the contextual state.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures:

FIGS. 4A and 4B are illustrations of an example display of driving information in a minimum minimized content view;

FIGS. 8A and 8B are illustrations of example tables that may be used as part as determining driving-context-relevant information to include in an instrument cluster display;

DETAILED DESCRIPTION

Figure 1A:
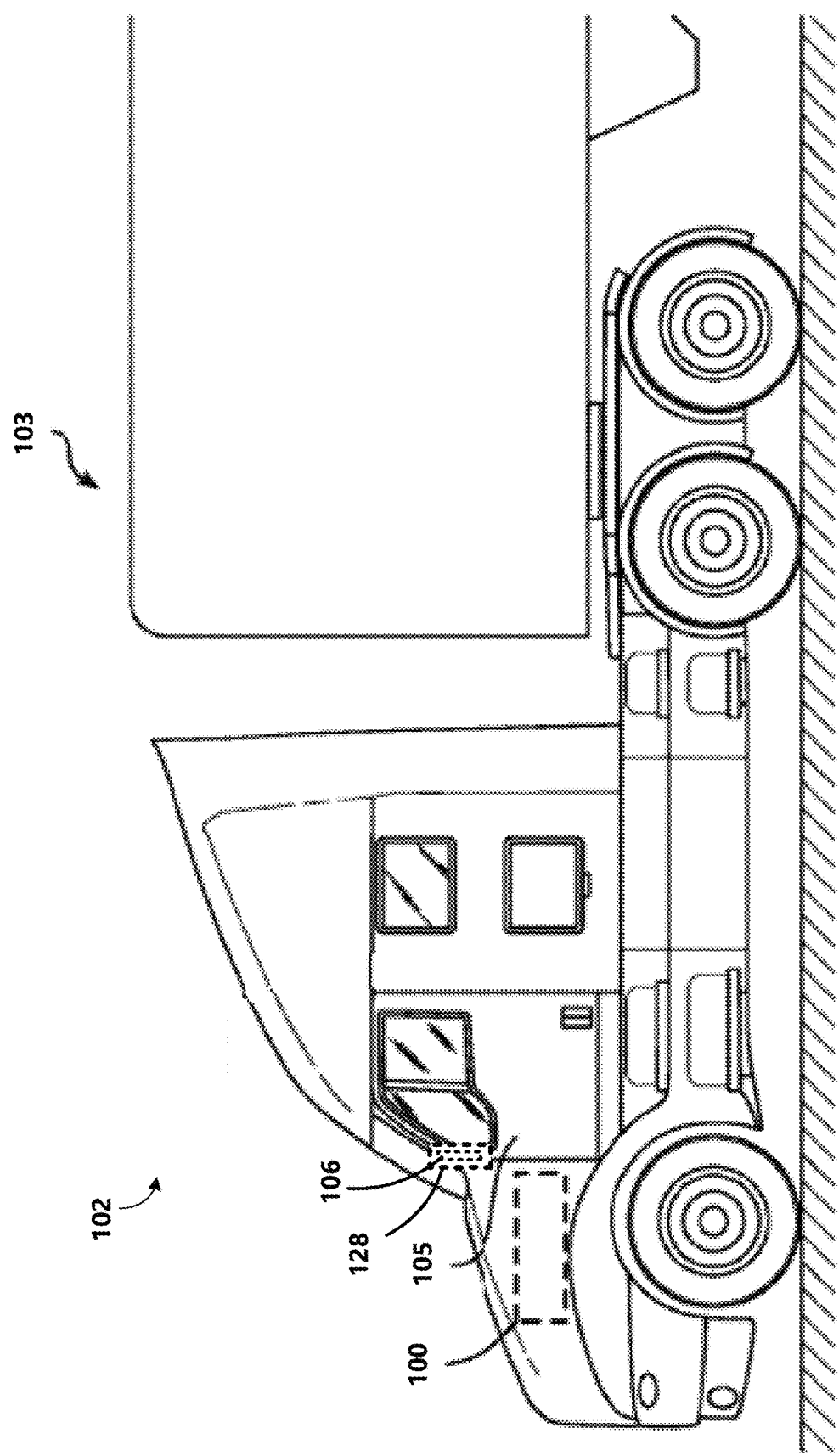
FIG. 1A is an illustration depicting a side view of a vehicle.

Aspects of the present disclosure are generally directed to systems, methods and computer readable storage media for providing a flexible and variability-accommodating instrument cluster for display on an in-vehicle screen and a user experience interaction model for providing a relevant set of information via the instrument cluster based on a determined contextual state of the vehicle. The detailed description set forth below in connection with the appended drawings is an illustrative and non-limiting description of various embodiments of the disclosed subject matter. Wherever possible, the same reference numbers are used in the drawings and the following description to refer to the same or similar elements. In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

The following description proceeds with reference to examples of systems and methods suitable for use in vehicles, such as Class 8 trucks. Although illustrative embodiments of the present disclosure will be described hereinafter with reference to vehicles, it will be appreciated that aspects of the present disclosure have wide application, and therefore, may be suitable for use with many types of vehicles, such as trucks, passenger vehicles, buses, commercial vehicles, light and medium duty vehicles, etc.

FIG. 1A depicts a side view of a vehicle 102. The vehicle 102 may be a part of a tractor-trailer combination, which may include the vehicle 102 having a so-called fifth wheel by which a box-like, flat-bed, or tanker semi-trailer 103 (among other examples) may be attached for transporting cargo or the like. While the vehicle 102 is depicted as a truck in FIG. 1A, it should be appreciated that the present technology is applicable to any type of vehicle where a dynamic driving-context-relevant instrument cluster display is desired.

The example vehicle 102 includes a cabin 105 from which a driver may operate the vehicle 102. The cabin 105 includes a display screen 128 on which a dynamic driving-context-relevant instrument cluster 106 may be displayed. According to one aspect, the instrument cluster 106 is configured to display a relevant set of information to the driver of the vehicle 102 based on a determined contextual state of the vehicle. The contextual state of the vehicle and the relevant set of information included in the displayed instrument cluster 106 may be determined by a contextual mode system 100 of the vehicle 102. Components and operations of an example contextual mode system 100 are discussed in further detail below.

Figure 1B:
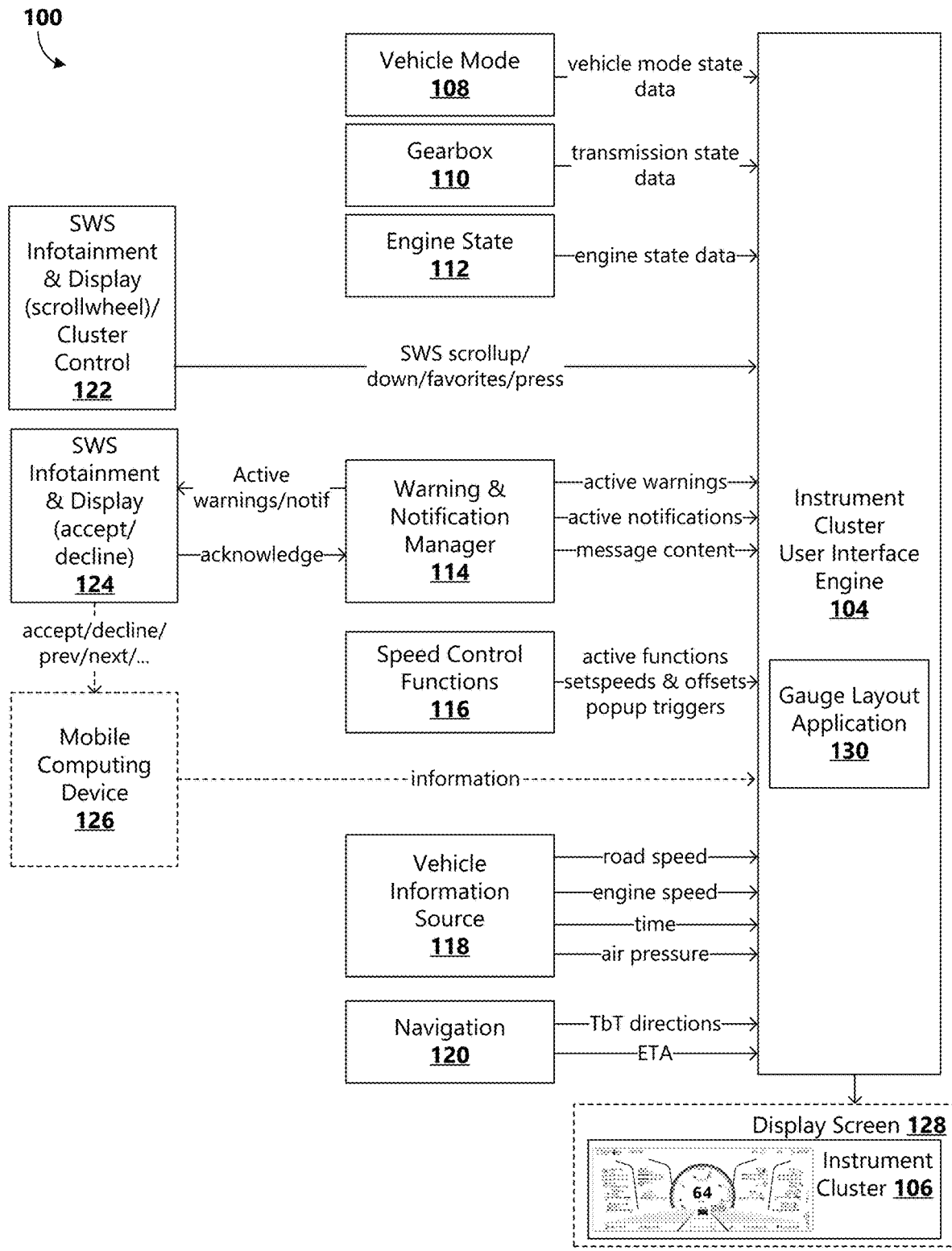
FIG. 1B is a block diagram of an example environment in which a system of the present disclosure can be implemented in a vehicle according to an embodiment.

With reference to FIG. 1B, a schematic block diagram is provided of an example contextual mode system 100 in which aspects of the present disclosure can be implemented. For example, some or all of the elements included in the instrument cluster display system 100 may be embodied in the vehicle 102. The example contextual mode system 100 includes a vehicle 102 on which various data sources are in communication with an instrument cluster user interface (UI) engine 104. According to an aspect, the instrument cluster UI engine 104 is illustrative of a software module, system, or device that is operative or configured to receive various signal inputs from a plurality of data sources and provide at least a portion of the dynamic driving-context-relevant instrument cluster 106 for display on the display screen 128 included in the vehicle 102. In some examples, the instrument cluster UI engine 104 may include or be communicatively connected to a gauge layout application 130 comprising logic rules and layout rules that may be used by the instrument cluster UI engine 104 to select inclusion, form, and placement of content in the instrument cluster 106. In various examples and as will be described in further detail below, the gauge layout application 130 may further comprising logic rules and layout rules that may be used by the instrument cluster UI engine 104 to determine a contextual state of the vehicle 102 based on various signal inputs from a plurality of sensors and other data sources and to determine a relevant set of information to include in the instrument cluster 106 display based on the contextual state.

The plurality of data sources may include any suitable data source, unit, or sensor operative to provide various data or signaling information that may be used by the instrument cluster UI engine 104 to provide vehicle-status-related information via the instrument cluster 106. The plurality of data sources can include, but are not limited to, a vehicle mode data source 108, a gearbox data source 110, an engine state data source 112, a warning and notification manager 114, a speed control function data source 116, a vehicle information data source 118, a navigation data source 120, and steering wheel switch (SWS) infotainment and display actuation data sources 122, 124 (e.g., via a scrollwheel actuator (also referred to herein as a cluster control 122) or an accept/decline actuator (124)). In some examples, another data source may include a mobile computing device 126 in communication with the instrument cluster UI engine 104. As can be appreciated, in other examples, additional or alternative data sources are possible and are within the scope of the present disclosure.

In an example aspect: the vehicle mode data source 108 is operative to provide vehicle mode state data; the gearbox data source 110 is operative to provide transmission state data; the engine state data source 112 is operative to provide engine state data; the warning and notification manager 114 is operative to provide information associated with active warnings, active notifications, and message content; the speed control function data source 116 is operative to provide information associated with active functions, set-speed values, offset values, and popup triggers; the vehicle information data source 118 is operative to provide information associated with the vehicle's road speed, engine speed, and air pressure, and time; the navigation data source 120 is operative to provide turn-by-turn direction information and estimated arrival time (ETA) information in association with a navigable route; the cluster control 122 is operative to enable the driver to easily transition between content views via a user input associated with the scrollwheel (e.g., a scroll-up, scroll-down, or press actuation). In some examples, the display screen 128 may include a touch interface via which the driver may be enabled to interact with the instrument cluster 106.

According to an aspect, the instrument cluster UI engine 104 is operative or configured to provide driving-context-relevant information that may be presented by the instrument cluster 106 including a relevant set of information based on a determined contextual state of the vehicle 102. For example, the relevant set of information may be determined and displayed automatically, rather than requiring a driver to manually navigate to specific screen content. By utilizing a digital display, the information presented to the driver may be dynamically streamlined to a situationally relevant set, thus helping to reduce driver distraction.

Figure 2:
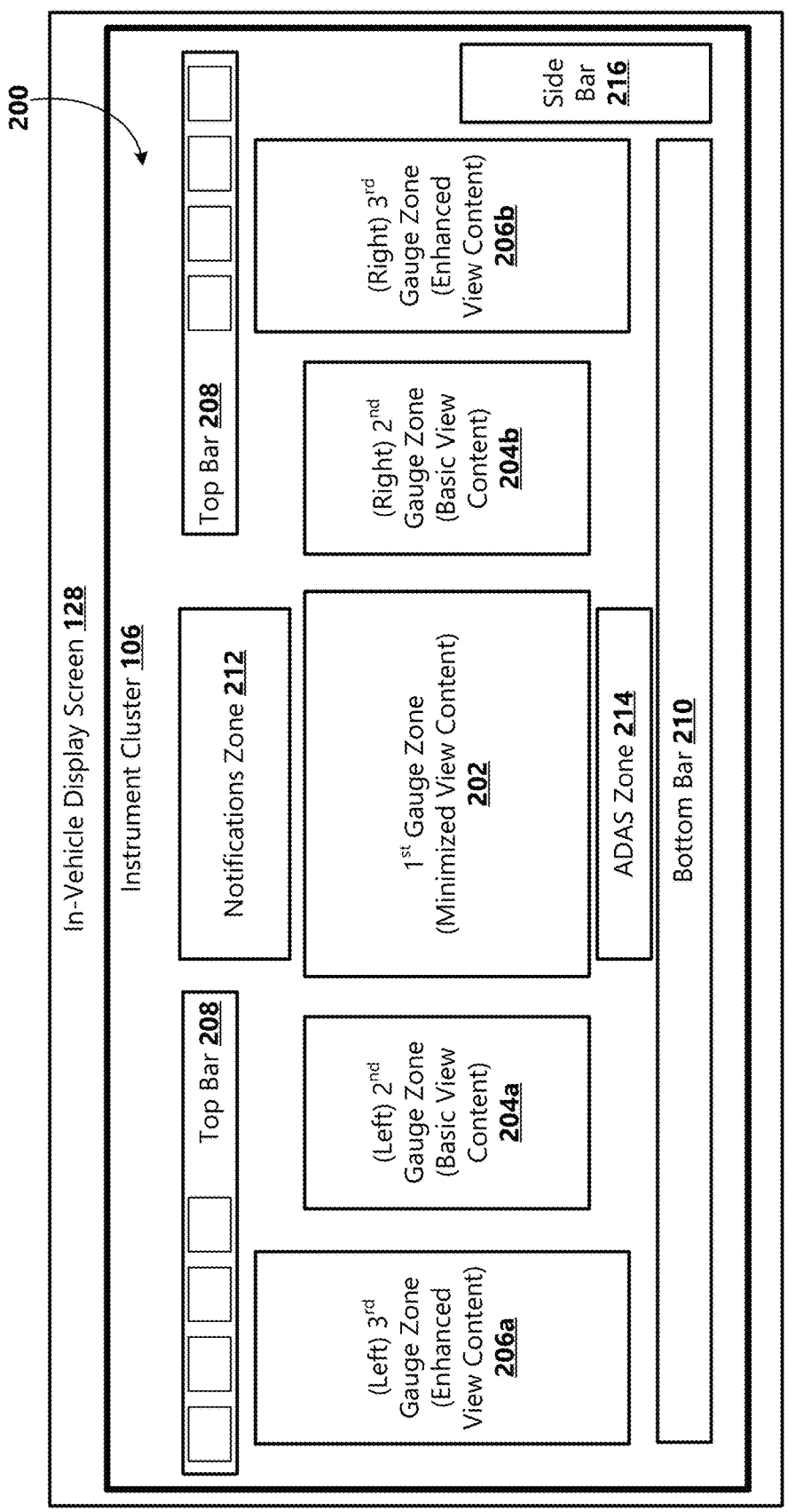
FIG. 2 is an illustration of an example schematic representation of an instrument panel according to an embodiment.

With reference now to FIG. 2, an example layout 200 of an instrument cluster 106 displayed on an in-vehicle display screen 128 is shown. For example, the layout 200 may be a default layout of the instrument cluster 106 and may comprise a plurality of content display zones 202-216 that may be displayed or hidden based on a user-selected content view and/or a determined driving context of the vehicle. In some examples and as will be described in further detail with reference to FIG. 3, the driver may be enabled to change the number of gauges displayed in the instrument cluster 106 by actuation of a simple thumb wheel scroll included in the cluster control 122. In some examples, the driver may be further enabled to further actuate (e.g., scroll) the thumb scroll to display a user-selected group of gauges in the instrument cluster 106. In some examples, the driver may be further enabled to further actuate (e.g., scroll) the thumb scroll to enable a contextual display mode that includes a dynamic display of relevant driving-context-relevant information.

According to an example aspect, the layout 200 of the instrument cluster 106 may include a first gauge zone 202 that may be shown in the minimized content view, in the basic content view, and in the enhanced content view, second gauge zones 204a,b (generally 204) that may be hidden in the minimized content view but shown in the basic content view and in the enhanced content view, and a third gauge zone 206a,b (generally 206) that may be hidden in the minimized content view and in the basic content view but shown in the enhanced content view. Examples of vehicle-status-related information that may be included in the various gauge zones 202-206 are described below with reference to various example illustrations.

Other elements that may be included in the default layout 200 of the instrument cluster 106 and that may be persistently displayed when the vehicle 102 is in drive mode may include a top bar 208, a bottom bar 210, and a side bar 216. In some examples, the top bar 208 may include a display of one or more of the following information elements: a voltmeter, a clock, an active warning indicator (e.g., indicating a number of active critical red warnings and amber warnings), an outside temperature indicator, and a diesel particulate filter (DPF) status indicator. In some examples, the bottom bar 210 may include a display of one or more of the following information elements: an odometer, a trip odometer, a sub-trip odometer, and engine power take-off (PTO) hours indicator (e.g., if the vehicle 102 is equipped with a PTO system). In some examples, the side bar 216 may include a display of a pagination indication of the drive view (e.g., an indication of an active content view page in relation to a set of content view pages) and a drive mode indication (e.g., an indication of a control position of the active gear: drive, neutral, reverse). As should be appreciated, additional and/or alternative information elements may be displayed in the instrument cluster 106 and are within the scope of the present disclosure.

In some examples, the content display zones included in the default layout 200 of the instrument cluster 106 may further include a notifications zone 212 and an advanced driver-assistance system (ADAS) zone 214. For example, the notifications zone 212 may include suppressible and non-suppressible popup notifications when a fault or a need to message the driver is triggered, and may further include a selectable display of information associated with information sources such as: entertainment/radio, a communicatively-connected mobile computing device 126 (e.g., mobile phone, music device), and navigation system 120. The ADAS zone 214 may be provided when the vehicle 102 is configured with an ADAS and the ADAS is active, and may include a display of passive and/or active driver assistance information, settings, and warnings. In some examples, the notifications zone 212 and the ADAS zone 214 are persistently displayed in each content view mode.

According to an aspect, the gauge layout application 130 may comprise logic rules and layout rules that may be used by the instrument cluster UI engine 104 to select inclusion and placement of available gauges in the dynamic content zone 234. In some examples, different formats may be used to conserve display area by either combining gauge functions or compressing the gauge information to make room for additional gauges to be displayed. For example, a gauge displayed in the dynamic content zone 234 may be in a single gauge format (e.g., one gauge function displayed individually), a double gauge format (e.g., two gauge functions displayed together), or a compact gauge format (gauges that have elements removed).

Figure 3:
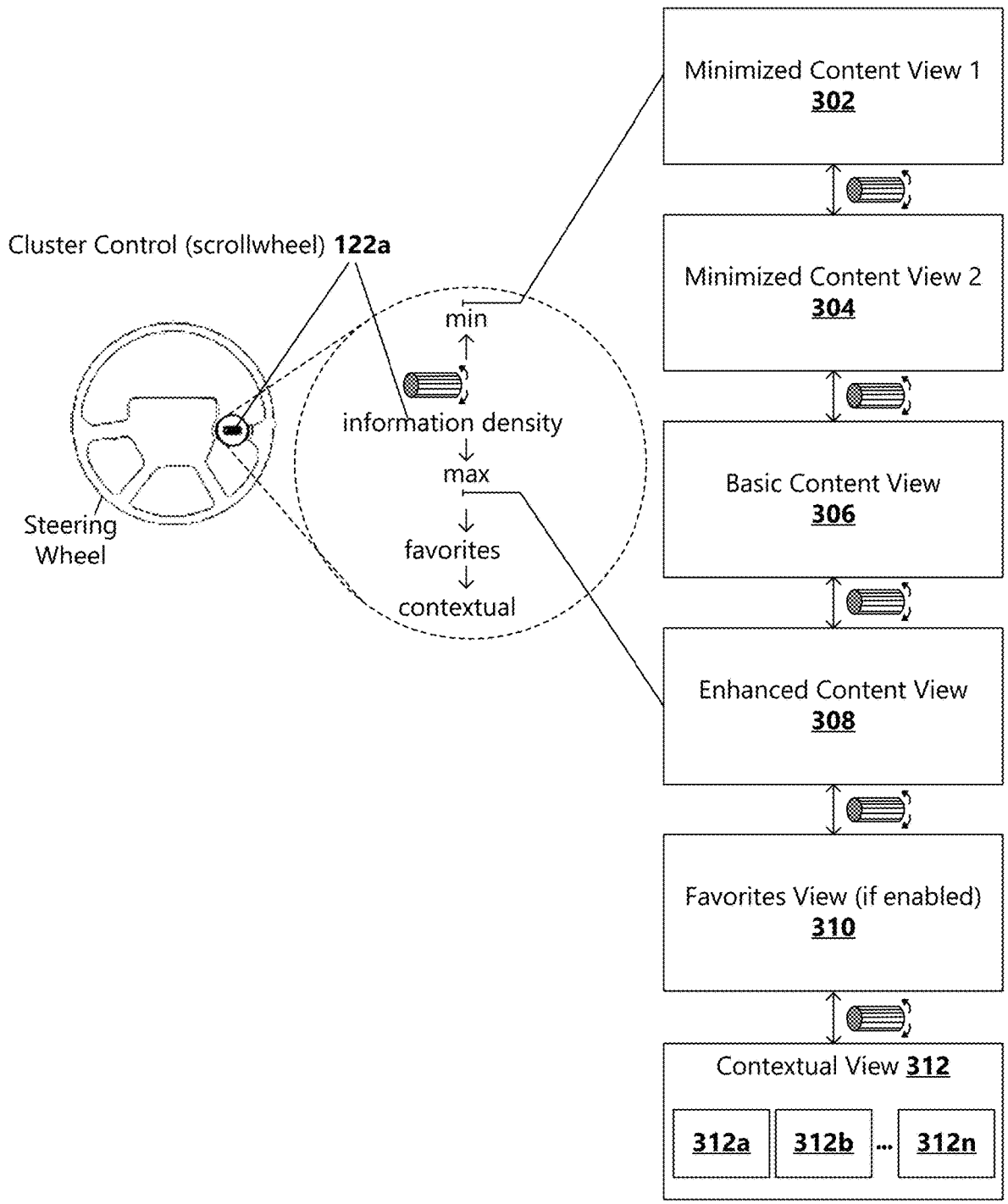
FIG. 3 is a block diagram of an example scrolling pattern between content views.

As mentioned above, the vehicle driver may be enabled to easily scroll between the various content views for selecting the content view with the amount of displayed information that suits the driver. With reference now to FIG. 3, an example scroll pattern of content views using the cluster control 122 is shown. According to an example, the cluster control 122 may be embodied as a thumb wheel scroll located on a steering wheel, and an ability to change the number of gauges displayed in the instrument cluster 106 may be provided by a simple thumb wheel scroll via the cluster control 122. Rather than replacing one digital gauge for another, scrolling to another display view may expand the display of gauges from a minimal view to a maximum number of gauges. In some examples, the display of gauges may range from a first minimized content view 302, to a second minimized content view 304, to a basic content view 306 to an enhanced content view 308. In some examples, a favorites view 310 may be enabled on the vehicle 102, and the favorites view 310 may be placed after the enhanced content view 308 in the scrollable set of gauge content views. In some examples, an interface feature may be provided that may protect the favorites view 310 from being a part of the main seamless scroll between the minimized-to-maximized content views (i.e., the first minimized content view 302, the second minimized content view 304, the basic content view 306, and the enhanced content view 308). In one example, the interface feature may be a requirement of a particular cluster control 122 actuation, such as an additional nudge.

In some examples, a contextual view 312 may be provided and placed after the favorites view 310 in the scrollable set of gauge content views. The contextual view 312 may include a display of gauges and messaging that provide the driver with information that may be relevant/useful based on a driving task at hand. In some examples, an interface feature may be provided in association with the cluster control 122 actuation, which may protect the contextual view 312 from being a part of a seamless scroll from the favorites view 310. According to an aspect, the contextual view 312 may be comprised of a plurality of contextual views 312a-n (generally 312), wherein a relevant contextual view 312 may be determined for the vehicle 102 at a given time based on an analysis of received signaling data. In some examples, a selection to display the instrument cluster 106 in the contextual view 312 may be received via an actuation of a menu function or by another method. Examples of various gauge content views are described below with reference to FIGS. 4A-4B, 5, 6, and 7.

FIGS. 4A-B show illustrations of an example instrument cluster 106 shown in the first minimized content view 302. According to an aspect, the minimized content views 302, 304 include a minimal amount of information that can be displayed to the driver while the vehicle 102 is in a driving mode (e.g., drive, neutral, or park), while suppressing a display of other (e.g., basic or enhanced content view) gauges that may be within normal usage ranges (e.g., as opposed to out-of-parameter or warning ranges). For example, when other gauges are within normal usage ranges, the driver may not need to monitor them. As such, suppression of the other gauges in the minimized content view may reduce driver distractions and may also allow for a dark cockpit mode that may provide for better driver night vision. In some examples, in the first minimized content view 302, a visual background of the instrument cluster 106 may be simplified, and in the second minimized content view 304 (not shown), the visual background of the instrument cluster 106 may include artistic design elements 402 (shown in FIGS. 5 and 6), such as a displayed pattern or shading. In some examples, the first minimized content view 302 may provide for a darkest-level dark cockpit mode that may provide for increased driver night vision. In some examples, the visual background of the instrument cluster 106 in the basic content view 306 and the enhanced content view 308 may also include the artistic design elements 402.

In the illustrated examples, the pagination indication 406 is shown as a sequence of indicators representing each available content view, wherein the sequence corresponds to the scrollable order of available content views (e.g., scrollable via user interaction with the cluster control 122). In some examples, the first indicator may represent the first minimized content view 302, the second indicator may represent the second minimized content view 304, the third indicator may represent the basic view 306, the fourth indicator may represent the enhanced view 308, and the fifth indicator may represent the favorites view 310, and the sixth indicator may represent the contextual view 312. A currently-displayed content view/card may be indicated by an increased saliency of the associated indicator included in the pagination indication 406.

According to an example and as illustrated in FIGS. 4A-B, when in the first minimized content view 302, the pagination indication 406 and a drive mode indication 408 included in the side bar 216 may indicate that the first minimized content view 302 is displayed and the control position of the active gear (e.g., drive, neutral, or reverse), respectively. Additionally, when in the minimized content view 302,304, vehicle status-related information may be shown in the first gauge zone 202. In some examples, the first gauge zone 202 may include at least a display of information associated with the vehicle's road speed and the vehicle's engine speed. For example and as illustrated, minimal view gauges 404 included for display in the minimized content view 302,304 may include a speedometer 404a and a tachometer 404b. In the example illustrated, the speedometer 404a is displayed in a digital format and the tachometer 404b is displayed as an analog gauge. Other configurations of the speedometer 404a and/or the tachometer 404b are possible and are within the scope of the present disclosure. As illustrated, in the minimized content view 302,304, the top bar 208 and bottom bar 210 may additionally be displayed. As shown in the example illustrations in FIG. 4B, when the vehicle 102 is configured with an ADAS and when the ADAS is active, in the minimized content view 302,304, the instrument cluster 106 may further include a display of ADAS-related passive and/or active driver assistance information, settings, and warnings in the ADAS zone 214.

Figure 5:
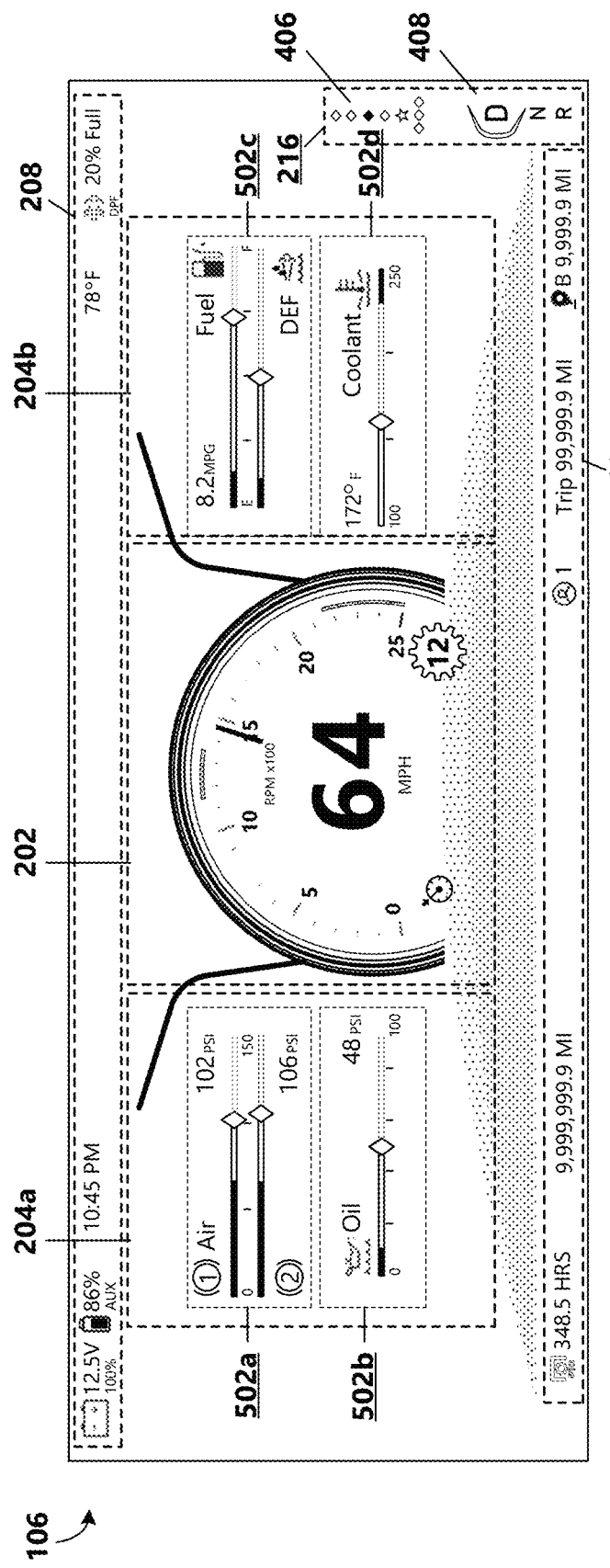
FIG. 5 is an illustration of an example display of driving information in a basic content view.

With reference now to FIG. 5, an illustration of an example instrument cluster 106 shown in a basic content view 306 is shown. As illustrated, when in the basic content view 306, the pagination indication 406 included in the side bar 216 may indicate that the basic content view 306 is displayed, and vehicle-status-related information may be shown relative to the first gauge zone 202 and the second gauge zones 204. According to an aspect, the basic content view 306 may include a display of information that may be typically provided by basic view gauges included in an instrument cluster of a vehicle 102. For example, the basic content view 306 may include a display of minimal view gauges 404 included in the minimized content view in the first gauge zone 202. Additionally, the second gauge zones 204 may include a display of basic view gauges 502, such as: one or more air pressure gauges 502a, one or more oil pressure gauges 502b, one or more fuel level gauges 502c (which may optionally include a diesel exhaust fluid (DEF) level gauge), and one or more water temperature gauges 502d, while suppressing a display of additional gauges that may be within normal usage ranges (e.g., as opposed to out-of-parameter or warning ranges). Although the gauges (e.g., basic view gauges 502 and other gauges) are illustrated as slider gauges, in other examples, the gauges may be displayed as analog gauges. In some examples, the gauges may include a scale, which may or may not include tickmarks, a pointer/indicator that moves in relation to the measurement represented by the particular gauge, and an indication of an out-of-parameter or warning zone. In some examples, the out-of-parameter zone may only be shown and visually highlighted (e.g., in comparison with a prewarning state) when a measurement is in the out-of-parameter zone.

According to an aspect, the basic view gauges 502 may have fixed positions within the second gauge zones 204 (e.g., air pressure gauge(s) 502a in an upper portion of the left second gauge zone 204a, oil pressure gauge(s) 502b in a lower portion of the left second gauge zone 204b, fuel gauge(s) 502c (e.g., one or a combination of: a single fuel gauge, multi-fuel gauge, DEF gauge) in an upper portion of the right second gauge zone 204b, and water temperature gauge(s) 502d in a lower portion of the right second gauge zone 204b. In some examples and as shown in FIG. 5, when the basic content view 306 is shown and when additional gauges (e.g., that may be selected for inclusion in the enhanced content view) are within normal usage ranges and suppressed from display, the second gauge zone 204a,b and the basic view gauges 502 may be sized to fill the available instrument cluster 106 screen space. Alternatively, if a non-displayed gauge goes into an out-of-parameter or warning range, a second gauge zone 204a,b (e.g., on a left or right side depending on the enhanced content view gauge 602 that is in an out-of-parameter or warning range) and the basic view gauges 502 included in the second gauge zone 204a,b may be resized to a smaller size so that a warning gauge can be unhidden. In some examples, when a non-displayed gauge goes into an out-of-parameter or warning range, the gauge information that goes into the out-of-parameter or warning range may be dynamically shown on the display screen 128 via a dynamic container.

Figure 6:
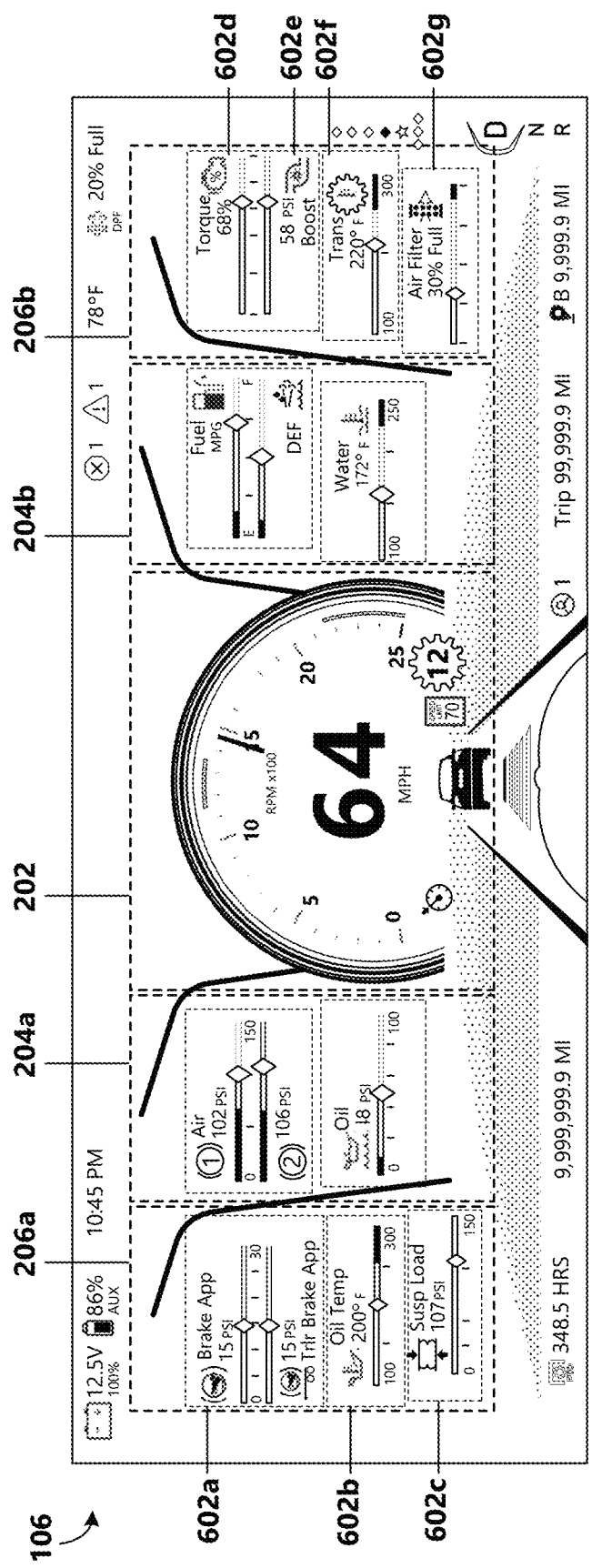
FIG. 6 is an illustration of an example display of driving information in an enhanced content view.

With reference now to FIG. 6, an illustration of an example instrument cluster 106 shown in an enhanced content view 308 is shown. As illustrated, when in the enhanced content view 308, the pagination indication 406 included in the side bar 216 may indicate that the enhanced content view 308 is displayed, and vehicle-status-related information may be shown relative to the first gauge zone 202, the second gauge zones 204, and the third gauge zones 206. According to an aspect, the enhanced content view 308 may include additional vehicle-status-related information (e.g., conditional and/or optional gauge content) that may be specific to the build configuration of the vehicle 102. For example, the enhanced view gauges 602 included in the enhanced view 308 may be defined by the truck order configuration and the layout may be determined by the gauge layout application 130. The enhanced content view 308 may include a display of minimal view gauges 404 included in the minimized content view 302,304 in the first gauge zone 202, a display of basic view gauges 502 included in the basic content view 306 in the second gauge zone 204, and additionally, in the third gauge zones 206, may include a display of one or more enhanced view gauges 602, such as but not limited to: a brake application gauge(s) 602a (e.g., truck and trailer brake application), an engine oil temperature gauge 602b, air suspension gauge(s) 602c, a torque gauge(s) 602d, a boost gauge 602e, a transmission oil temperature gauge 602f, an air filter gauge 602g, a steering axle temperature gauge (not shown), a front-rear axle temperature gauge 602h (FIG. 7), a center-rear axle temperature gauge (not shown), a rear-rear axle temperature gauge 602i (FIG. 7), a fuel filter restriction gauge (not shown), an auxiliary transmission temperature gauge (not shown), a transfer case oil temperature gauge (not shown), an electric current/ammeter gauge (not shown), and a trailer reservoir pressure gauge (not shown).

According to an aspect, the layout of the enhanced view gauges 602 is variable depending on how the vehicle was ordered and depending on how the enhanced view gauges 602 may be pre-prioritized and stored into memory. In some examples, basic view gauges 502 may be standard across various vehicles, but the enhanced gauges 602 (e.g., selection of and display position) may be specific to the vehicle build configuration and priority of available gauges. In some examples, the instrument cluster UI engine 104 may include or be communicatively connected to the gauge layout application 130 comprising logic rules (e.g., a priority level, warning state, included in a super or combo gauge) and layout rules that may be used by the instrument cluster UI engine 104 to select inclusion and placement of gauges in the various content views 302-312.

According to an aspect, the gauge layout application 130 is illustrative of a software module, system, or device that is operative or configured to provide a configuration function for specific vehicles. For example, gauge layout application 130 may comprise logic programs, priority assignments, and assigned rule sets used to determine the dynamic placement of enhanced 602 gauges onto the instrument cluster 106 display interface. The gauge layout application 130 may be configured to address an increased complexity of gauge display and layout in a digital instrumentation system implementation, instead of simply having to address physical space locations. The gauge layout application 130 may further include logic for determining which gauges may be co-located or grouped together and how those groups may fit into the instrument cluster 106 interface relative to other gauges. In some examples, the gauge layout application 130 may provide a systematic and repeatable method of performing a consistent content layout of variable gauges on a digital instrumentation system, while accommodating the actual variability of a production truck environment (e.g., cars may not have the same instrumentation variability requirements as trucks). In some examples, the gauge layout application 130 may further enable a fleet manager to configure or control what is shown to a driver. In some examples, the gauge layout application 130 may be further configured to determine which gauges may be suited for inclusion in a dynamic container in normal views.

In some examples, a gauge may be one of various types of gauges, such as a single gauge, a super gauge, or a combination gauge. For example, a single gauge may be a stand-alone gauge that may appear as a single gauge either because it exists only as a single gauge (e.g., an oil temperature gauge 602b) or because another gauge that it may be combined with is not available for the particular vehicle 102. Other example single gauges may include an air filter gauge 602g, a single drive axle oil temperature gauge, an ammeter, and a trailer reservoir air pressure gauge.

In some examples, based on a determination made by the gauge layout application 130, a gauge may be shown in different formats to conserve display area by either combining gauge functions or by compressing the gauge information to make room for additional gauges to be displayed.

As an example, in the enhanced content view 308, the appearance of a dynamic container (i.e., a container that may be dynamically displayed when a non-displayed gauge that may not have an assigned position in the enhanced content view is out-of-parameter (pre-warning) or in warning state) may cause the enhanced view gauges 602 displayed above the dynamic container to be transitioned into a compact mode (e.g., a smaller version so that there is room for the dynamic container). When the dynamic container disappears, the compact mode the compacted enhanced view gauges 602 may transition back to their normal view.

As another example, the gauge layout application 130 may be configured to automatically combine two or more gauges that can share a same scale in a super gauge. For example, a super gauge can include a plurality of gauges combining multiple readouts into one gauge footprint. An example of a super gauge is the brake application gauge(s) 602a that combines a truck application pressure gauge and a trailer brake application pressure gauge, and uses one gauge footprint and shares a scale. Other example super gauges may include an air suspension super gauge, a fuel and air filter super gauge, various axle oil temperature combinations, and super gauges for various combinations of transmission oil temperature, transfer case oil temperature, and auxiliary transmission oil temperature.

As another example, the gauge layout application 130 may be configured to automatically make a determination as to whether two or more gauges may be related and can be brought together in a combination (combo) gauge that may or may not share a same scale. An example of a combo gauge is the combination of the torque gauge 602d and the boost gauge 602e into one gauge footprint (as indicated by the dotted outline). In this example, the torque gauge 602d and the boost gauge 602e share a scale, but use different units of measure. In some examples, when two or more gauges are assigned to each other either as a super gauge or as a combo gauge as part of a truck configuration, then the two or more gauges may be automatically displayed as such.

In some examples, the instrument cluster UI engine 104 may be configured to provide a favorites or custom function that enables a driver to customize a content view (e.g., outside of the default minimized-to-maximized content views). The favorites or custom function may allow for a driver-selectable set of gauges to be configured as a favorites view 310. In some examples, a fleet manager may use the favorites view 310 to configure an alternative gauge set for a specialized usage. For example, at a factory order time, the favorites view 310 may be pre-configured to include a specific set of "work" gauges for a particular task (e.g., an operation, such as a PTO operation mode). In some examples, a fleet manager may be enabled to lock a pre-configured favorites view 310 from driver manipulation or disable the favorites/custom function should they not want the driver to have access to this level of customization. In some examples, a particular favorites view 310 may be associated with a particular driver. According to an aspect, the favorites/custom function may allow the driver to place any available gauge into his/her own custom configuration screen setup. In one example, a favorites view 310 may allow for configuring a custom set of up to N (e.g., 16) gauge items in the enhanced content view 308 when utilizing super gauging. In some examples, an indication of the driver's identity may be received by the instrument cluster UI engine 104, and be used to retrieve a favorites/custom gauge set configuration associated with the driver's identity. In some examples, when utilized with a driver profiles feature (described below), a vehicle 102 can provide a plurality of favorites views 310, wherein each driver of a plurality of drivers may have his/her own gauge set configuration. In some examples, the favorites view 310 can auto-suggest or be auto-populated with a set of gauges intelligently determined based on driving behavior or application.

As mentioned above, in some examples, the gauge layout application 130 may comprise logic rules and layout rules that may be used by the instrument cluster UI engine 104 to provide a contextual view 312 mode that provides an instrument cluster display 106 that may be automatically updated to show driving-context-relevant information. According to an aspect, the gauge layout application 130 is configured to evaluate various signal inputs from a plurality of data sources. For example, various signal values may (individually or in combination with other signal values) indicate various conditions (e.g., vehicle state, location, a point/position in a journey) of the vehicle 102. Based on the evaluation of various signal inputs/identified conditions, a determination may be made as to a current contextual state of the vehicle 102. For example, various contextual states may be defined, wherein one or a combination of signal inputs may be correlated with a particular contextual state. Some example contextual states include, but are not limited to, a highway/steady state, a city state, a night state, a day state, a standstill state, a parking state, a hill climb state, a descent/downhill state, a beginning trip state, and an ending trip/approaching destination state. As can be appreciated, other contextual states are possible and are within the scope of the present disclosure.

In some examples, each contextual state may be related to one or more driving tasks associated with the contextual state and linked with a set of information determined to be relevant to the contextual state. Examples of driving tasks may include driver actions that may control the vehicle 102 (e.g., accelerating, down-shifting, parking) and/or monitoring various information for safe operation of the vehicle, etc. In some examples, the context-relevant-information may include a set of gauges selected for inclusion in the instrument cluster 106. In some examples, the context-relevant-information may include selected messaging displayed in the notifications zone 212. For example, the context-relevant-information may provide the driver with information that may be relevant and useful to the driver for the particular driving task at hand. According to an aspect, the gauge layout application 130 may be further configured to determine the form, placement, and display properties of the context-relevant-information in the instrument cluster 106. In some examples, a user (e.g., the driver) may be enabled to customize the inclusion and layout of the gauges shown in the different contextual views 312. For example, a menu function may be provided that may allow the driver to select which gauges or messaging to include in a contextual view 312 and/or a layout or display attributes of the selected gauges or messaging.

Figure 7:
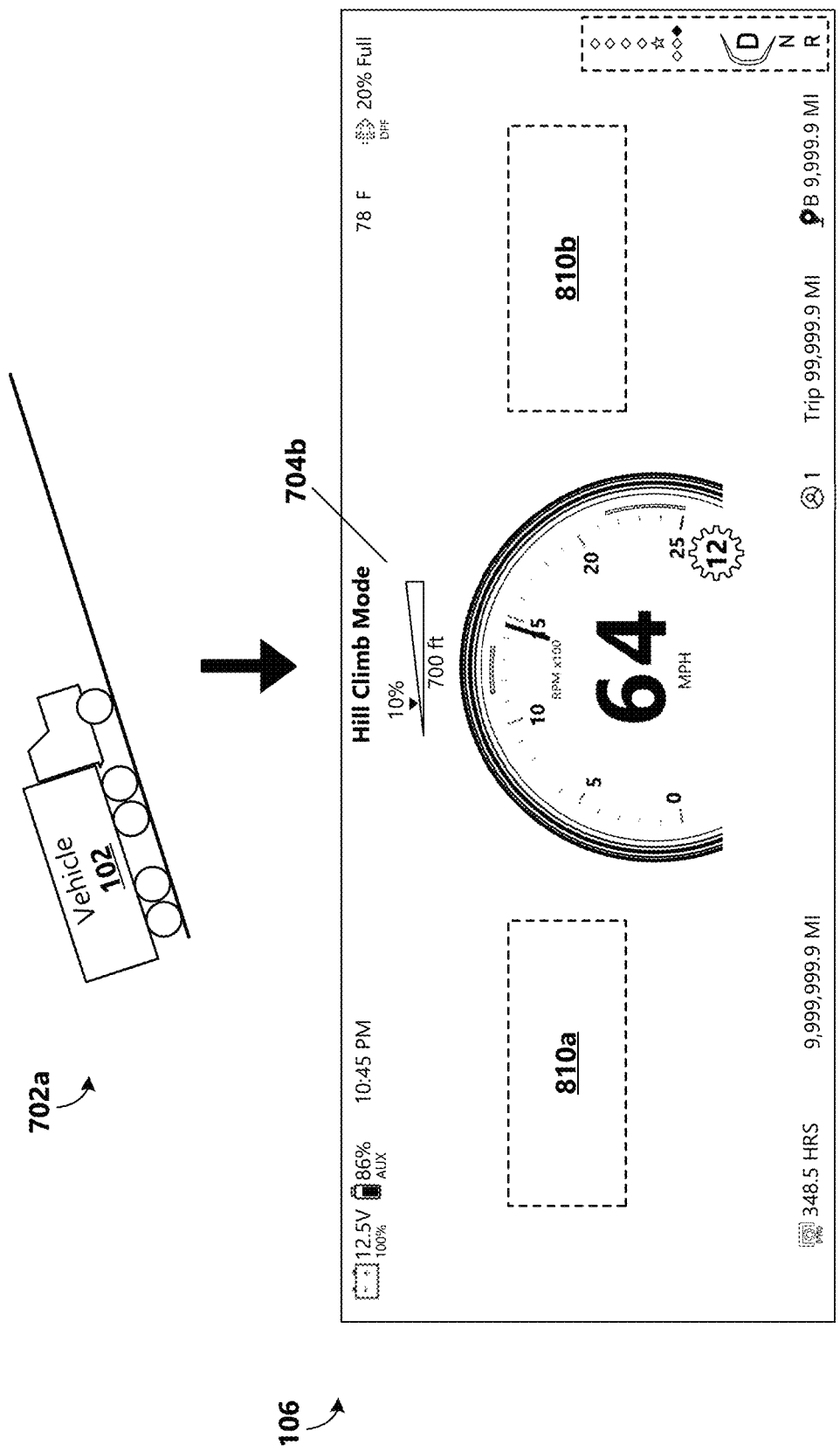
FIG. 7 is an illustration of an example display of driving-context-relevant information in an example instrument cluster.

With reference now to FIG. 7, one example display of driving-context-relevant information is shown. According to an aspect, various signaling data may be received and evaluated as part of determining a current contextual state 702 of the vehicle 102. As an example, the received signaling data may include information about physical conditions experienced by the vehicle, such as the vehicle's location, road speed, engine speed, air pressures, torque, various axle oil temperatures, transmission oil temperatures, transfer case oil temperature, auxiliary transmission oil temperature, engine temperature, navigation information, estimated arrival time (ETA) information in association with a navigable route, time, temperature, etc. Signaling information may comprise data derived from sensor readings from sensors placed on various parts of the vehicle.

In some examples, the gauge layout application 130 may access one or more stored rules to use to evaluate the received signaling data, wherein one or a combination of signaling data values and/or a changes in signaling data may correspond with a defined condition (e.g., defined and stored in memory). As an example, changes in vehicle speed may correspond with deceleration or acceleration. As another example, changes in changes in altitude may correspond with an uphill ascent or a downhill descent. As another example, detection of an engine retarder demand or brake-pedal depression indicate braking. According to an aspect, one or combinations of conditions 804 may indicate a particular contextual state 702 (of a plurality of possible contextual states 702). As an example and with reference to FIG. 8A, the gauge layout application 130 may be configured to reference a table, such as an example table 802 illustrated in FIG. 8A. For example, conditions A, B, C, and E 804a,b,c,e may be associated with a plurality of conditions being experienced by the vehicle 102 based on an evaluation of received signaling data (e.g., a deceleration condition, a non-braking condition, an increased power condition, an increased engine temperature condition). The combination of these conditions 804a,b,c,e may be mapped to a contextual state 702a (CS1 in FIG. 8A) of a plurality of defined contextual states 702a-n (generally 702). As an example, contextual state CS1 702a may be an uphill climb contextual state. In some examples, the combination of conditions 804a,b,c,e may be further combined and/or evaluated against other data, which may be provided by one or more other data sources. As an example, the gauge layout application 130 may access navigational data (e.g., GPS coordinates, latitude and longitude coordinates, altitude and/or elevation measurements, the vehicle's planned route) that may be evaluated as part of determining whether the conditions 804a,b,c,e being experienced by the vehicle 102 match criteria associated with the contextual state 702a. That is, based on the evaluation of various signal inputs/identified conditions, a determination may be made as to a current contextual state 702 of the vehicle 102.

According to an aspect, the gauge layout application 130 may be configured to determine a set of driving-context-relevant information to include for display in the instrument cluster 106. In some examples and with reference to FIG. 8B, the gauge layout application 130 may be configured to reference a table, such as an example table 806 illustrated in FIG. 8B as part of determining the set of driving-context-relevant information 808 of a plurality sets of driving-context-relevant information 808a-n (generally 808) that may be associated with various contextual states 702a-n. For example, each contextual state 702 may be associated with a set of driving-context-relevant information 808 that may be comprised of one or a combination of gauges 810a-n (generally 810) and messaging 812a-n (generally 812). The set of driving-context-relevant information 808 determined for a contextual state 702 may be used by the gauge layout application 130 to dynamically and automatically modify the instrument cluster 106 display to show one or more gauges 810 and/or messaging 812, such that information relevant and useful to the driver for the driving task at hand may be provided. In examples, the contextual state is determined inferentially from the signaling information rather than by the vehicle operator specifically inputting a particular contextual state.

As an example, gauges A and B 810a,b and message B 812b may be associated with contextual state CS1 702a, wherein gauges A and B 810a,b may include gauges 810 that may be determined to be relevant to the vehicle performing an uphill climb. Although two gauges are included in the example, as should be appreciated, other numbers/combinations of gauges 810 may be included in a driving-context-relevant information set 808. Examples of gauges that may be included in the uphill climb contextual state CS1 702a may include gauges representing the vehicle's road speed, engine speed, air pressures, torque, various axle oil temperatures, transmission oil temperatures, transfer case oil temperature, auxiliary transmission oil temperature, coolant temperature, etc. Continuing with the example, message B 704b may include a message such as a title of the active contextual state 702a, an indication of the vehicle's current status as it relates to the contextual state 702a. For example and with reference again to FIG. 7, the message 704b may include an icon indicating the climb, the grade, the distance associated with the climb, and the vehicle's 102 position relative to the hill climb. As should be appreciated, additional and/or alternative information may be included in the message 704b.

In some examples, one or more functions may be associated with a contextual state 702 and may be activated or deactivated when a contextual state 702 is active. As an example, a standstill contextual state 702 may be determined as a current status of the vehicle 102 based on conditions associated with a standstill state; and when the standstill contextual state 702 is active based on the determination, one or more instrument cluster 106 menu items that may be deactivated during a normal driving mode may be available to the driver to activate/interact with.

Figure 9:
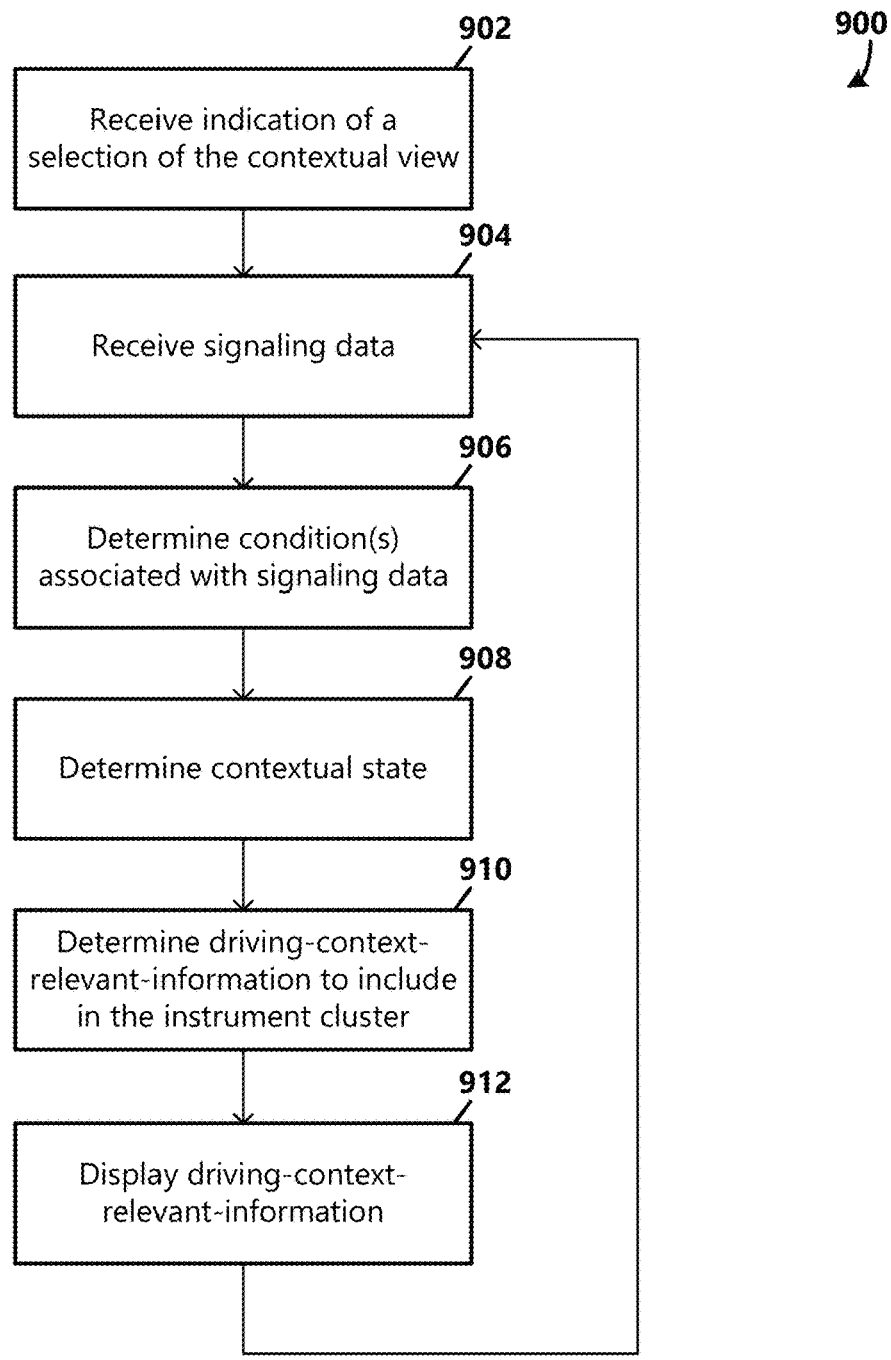
FIG. 9 is a flow diagram depicting general stages of an example process for providing dynamic driving-context-relevant information in an instrument cluster display.

FIG. 9 is a flow diagram depicting general stages of an example method 900 for providing dynamic driving-context-relevant information 808 for display on an in-vehicle screen 128. At OPERATION 901, the instrument cluster 106 of the vehicle 102 may be displayed in a first content view (e.g., a minimized content view, basic content view, or enhanced content view), wherein the first content view may include a set of displayed information based on a layout template associated with the content view.

At OPERATION 902, an indication is received of a selection to display the instrument cluster 106 of the vehicle in a contextual view 312, wherein the contextual view may include a display of driving-context-relevant information 808 that may be relevant/useful based on a driving task at hand. In some examples, the indication of the selection to display in the instrument cluster 106 in the contextual view 312 may be received responsive to an actuation of the cluster control 122. In other examples, the indication of the selection to display in the instrument cluster 106 in the contextual view 312 may be received responsive to another user selection, such as via a menu.

At OPERATION 904, various signaling data may be received from various sensors and/or data sources, wherein the received signaling data may include information that may reveal a current contextual state 702 of the vehicle 102. For example, the signaling data may include information about the vehicle's location, road speed, engine speed, air pressures, torque, various axle oil temperatures, transmission oil temperatures, transfer case oil temperature, auxiliary transmission oil temperature, navigation information, estimated arrival time (ETA) information in association with a navigable route, time, temperature, etc.

At OPERATION 906, the signaling data may be evaluated for automatically determining one or more conditions 804 associated with the signaling data. For example, the gauge layout application 130 may access one or more stored rules to use to analyze the signaling data for determining whether one or a combination of the signaling data values or changes in signaling data may correspond with a defined condition 804 (e.g., a deceleration condition, a non-braking condition, an increased power condition, an increased engine temperature condition).

At OPERATION 908, a contextual state 702 of the vehicle 102 may be determined based on an evaluation of the one or more identified conditions 804. In examples, the determination is inferential based on the identified conditions, and not directly indicated by a vehicle operator. For example, the one or more conditions 804 determined as being experienced by the vehicle 102 may be evaluated for determining whether the condition(s) 804 match criteria associated with a contextual state 702. In some examples, a table 802 may be used to determine whether the one or a combination of the condition(s) 804 may correspond with/be mapped to a contextual state 702 (e.g., a highway/steady state, a city state, a night state, a day state, a standstill state, a parking state, a hill climb state, a descent/downhill state, a beginning trip state, or an ending trip/approaching destination state). Accordingly, if one or a combination of the condition(s) 804 correspond with/can be mapped to a contextual state 702, the contextual state 702 may be determined as active in association with the vehicle 102.

At OPERATION 910, a set of driving-context-relevant information 808 may be determined for display in the instrument cluster 106 based on the contextual state 702. In some examples, a table 806 may be used to determine which gauges 810 and/or messaging 704 may correspond with/can be mapped to the contextual state 702. The determined gauges 810 and/or messaging 704 may be determined as the set of driving-context-relevant information 808 to be displayed in the instrument cluster 106.

At OPERATION 912, the instrument cluster 106 displayed in the first content view may be updated to display the determined set of driving-context-relevant information 808 according to various layout rules and/or a user-configured layout. Accordingly, information that may be relevant and useful to the driver for the particular driving task at hand may be automatically displayed, rather than requiring the driver to manually navigate to specific screen content or anticipate needs in a favorites view. Automatically displaying of context-relevant information and modifying the displayed instrument cluster 106 to streamline the information presented to the driver to a determined relevant and useful set may help to reduce driver distraction and increase safety. The method 900 may return to OPERATION 904, where signaling data may continue to be received.

Figure 10:
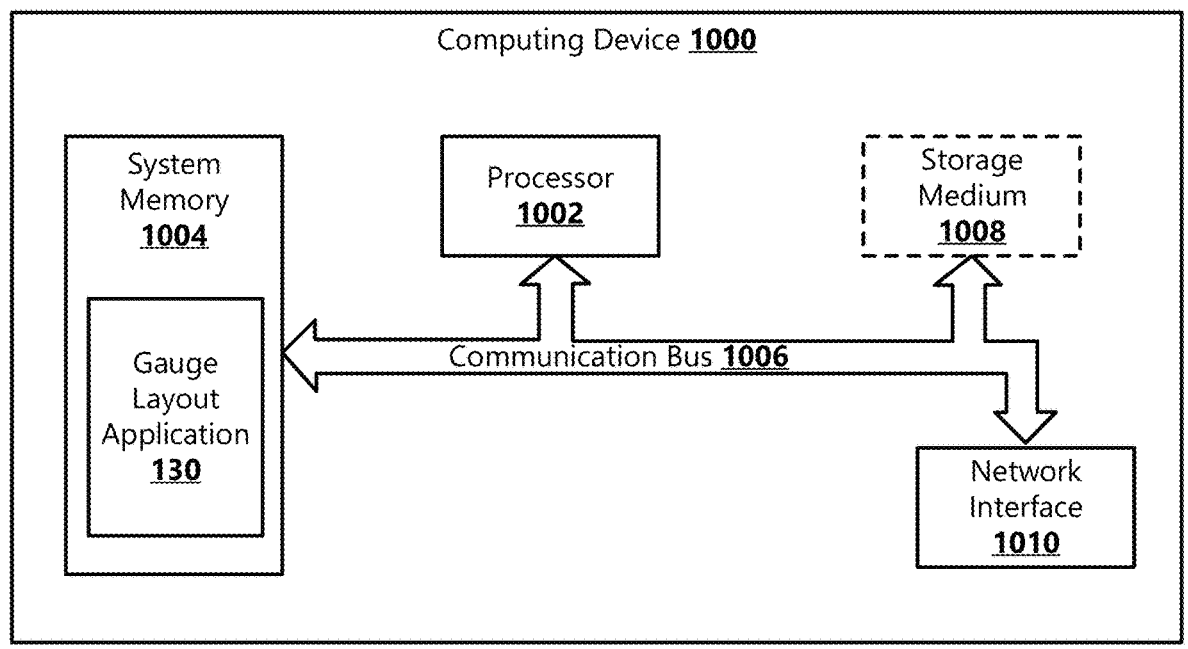
FIG. 10 is a block diagram of an example physical components of a computing device or system with which embodiments may be practiced.

FIG. 10 is a block diagram of an illustrative computing device 1000 appropriate for use in accordance with embodiments of the present disclosure. The description below is applicable to servers, personal computers, mobile phones, smart phones, tablet computers, embedded computing devices, and other currently available or yet-to-be-developed devices that may be used in accordance with embodiments of the present disclosure.

In its most basic configuration, the computing device 1000 includes at least one processor 1002 and a system memory 1004 connected by a communication bus 1006. Depending on the exact configuration and type of device, the system memory 1004 may be volatile or nonvolatile memory, such as read-only memory ("ROM"), random access memory ("RAM"), EEPROM, flash memory, or other memory technology. Those of ordinary skill in the art and others will recognize that system memory 1004 typically stores data or program modules that are immediately accessible to or currently being operated on by the processor 1002. In some examples, system memory 1004 may store an application to perform elements of the present systems and methods, such as gauge layout application 130. In this regard, the processor 1002 may serve as a computational center of the computing device 1000 by supporting the execution of instructions.

As further illustrated in FIG. 10, the computing device 1000 may include a network interface 1010 comprising one or more components for communicating with other devices over a network. Embodiments of the present disclosure may access basic services that utilize the network interface 1010 to perform communications using common network protocols. The network interface 1010 may also include a wireless network interface configured to communicate via one or more wireless communication protocols, such as WiFi, 2G, 3G, 4G, LTE, WiMAX, Bluetooth, or the like.

In the illustrative embodiment depicted in FIG. 10, the computing device 1000 also includes a storage medium 1008. However, services may be accessed using a computing device that does not include means for persisting data to a local storage medium. Therefore, the storage medium 1008 depicted in FIG. 10 is optional. In any event, the storage medium 1008 may be volatile or nonvolatile, removable or non-removable, implemented using any technology capable of storing information such as, but not limited to, a hard drive, solid state drive, CD-ROM, DVD, or other disk storage, magnetic tape, magnetic disk storage, or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 1004 and storage medium 1008 depicted in FIG. 10 are examples of computer-readable media.

For ease of illustration and because it is not important for an understanding of the claimed subject matter, FIG. 10 does not show some of the typical components of many computing devices. In this regard, the computing device 1000 may include input devices, such as a keyboard, keypad, mouse, trackball, microphone, video camera, touchpad, touchscreen, electronic pen, stylus, or the like. Such input devices may be coupled to the computing device 1000 by wired or wireless connections including RF, infrared, serial, parallel, Bluetooth, USB, or other suitable connection protocols using wireless or physical connections.

In any of the described examples, data can be captured by input devices and transmitted or stored for future processing.

The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computing device 1000 (e.g., a client device), or can be integral components of the computing device 1000. In some embodiments, multiple input devices may be combined into a single, multifunction input device (e.g., a video camera with an integrated microphone). The computing device 1000 may also include output devices such as a display, speakers, printer, etc. The output devices may include video output devices such as a display or touchscreen. The output devices also may include audio output devices such as external speakers or earphones. The output devices can be separate from and communicatively coupled to the computing device 1000, or can be integral components of the computing device 1000. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, or the like. Computing logic may be compiled into executable programs or written in interpreted programming languages. Generally, functionality described herein can be implemented as logic modules that can be duplicated to provide greater processing capability, merged with other modules, or divided into sub-modules. The computing logic can be stored in any type of computer-readable medium (e.g., a non-transitory medium such as a memory or storage medium) or computer storage device and be stored on and executed by one or more general-purpose or special-purpose processors, thus creating a special-purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

We claim:

1. A method for providing context-relevant information in an instrument cluster for display on a screen in a vehicle, comprising:
    displaying the instrument cluster in a first content view of a set of content views;
    receiving an indication of a user selection to change the displayed first content view to a contextual content view;
    receiving signaling data from a plurality of data sources, the signaling data including data about physical conditions experienced by the vehicle derived from sensor readings from sensors included on the vehicle;
    evaluating the signaling data to determine whether one of a plurality of predefined contextual states is associated with at least part of the signaling data,
    wherein each predefined contextual state has associated with it one or more signaling data values of the signaling data, each signaling data value being associated with a condition being experienced by the vehicle,
    wherein each predefined contextual state is associated with context-relevant information, the context relevant information including one or more gauges;
    in response to inferentially determining that at least part of the signaling data is associated with one of the plurality of predefined contextual states, displaying the instrument cluster in the contextual view, wherein displaying the instrument cluster in the contextual view comprises displaying a set of driving-context-relevant information in the displayed instrument cluster based on the contextual state, the driving-context-relevant information including the context relevant information associated with the determined predefined contextual state; and
    displaying a message indicating the determined predefined contextual state.

2. The method of claim 1, wherein evaluating the signaling data comprises:
    determining whether one or a combination of signaling data values or a change in signaling data values correspond with one or more defined conditions; and in response to determining that one or a combination of signaling data values or a change in signaling data values correspond with one or more defined conditions, determining whether the one or more defined conditions are associated with the contextual state.

3. The method of claim 2, wherein in response to determining that the one or more defined conditions are associated with the contextual state:
determining the set of driving-context-relevant information to include in the contextual view.

4. The method of claim 3, wherein determining the set of driving-context-relevant information to include in the contextual view comprises determining one or more gauges that are relevant to the one or more defined conditions associated with the contextual state.

5. The method of claim 3, wherein determining the set of driving-context-relevant information to include in the contextual view comprises determining one or more messages that are relevant to the one or more defined conditions associated with the contextual state.

6. The method of claim 3, wherein determining the set of driving-context-relevant information to include in the contextual view comprises determining information selected by a user to include for the contextual view of the contextual state.

7. The method of claim 1, wherein displaying the set of driving-context-relevant information in the displayed instrument cluster comprises displaying the set of driving-context-relevant information according to user-configured settings.

8. The method of claim 7, wherein prior to displaying the instrument cluster in the first content view, receiving user input of one or more user-configured settings associated with at least one of:
inclusion of a gauge or message in the contextual view of the contextual state;
placement of the gauge or message in the contextual view;
display attributes of the gauge or message in the contextual view.

9. The method of claim 1, wherein determining that at least part of the signaling data is associated with the contextual state comprises determining that at least part of the signaling data is associated with one of:
a highway/steady state;
a city state;
a night state;
a day state;
a standstill state;
a parking state;
a hill climb state;
a descent/downhill state;
a beginning trip state; or
an ending trip/approaching destination state.

10. A system for providing context-relevant information in an instrument cluster for display on a screen in a vehicle; the system comprising:
at least one processor;
a memory storage device including instructions that when executed by the at least one processor are configured to:
display the instrument cluster in a first content view of a set of content views;
receive an indication of a user selection to change the displayed first content view to a contextual content view;
receive signaling data from a plurality of data sources, the signaling data including data about physical conditions experienced by the vehicle derived from sensor readings from sensors included on the vehicle;
evaluate the signaling data to determine whether one of a plurality of predefined contextual states is associated with at least part of the signaling data,
wherein each predefined contextual state has associated with it one or more signaling data inputs of the signaling data, each signaling data input being associated with a condition being experienced by the vehicle,
wherein each predefined contextual state has associated with it context-relevant information, the context relevant information including one or more gauges;
in response to inferentially determining that at least part of the signaling data is associated with one of the plurality of predefined contextual states, display the instrument cluster in the contextual view, wherein displaying the instrument cluster in the contextual view comprises displaying a set of driving-context-relevant information in the displayed instrument cluster based on the contextual state, the driving-context-relevant information including the context relevant information associated with the determined predefined contextual state; and
display a message indicating the determined predefined contextual state.

11. The system of claim 10, wherein in evaluating the signaling data, the system is configured to:
determine whether one or a combination of signaling data values or a change in signaling data values correspond with one or more defined conditions; and
in response to a determination that one or a combination of signaling data values or a change in signaling data values correspond with one or more defined conditions, determine whether the one or more defined conditions are associated with the contextual state.

12. The system of claim 11, wherein in response to the determination that the one or more defined conditions are associated with the contextual state, the system is further configured to determine the set of driving-context-relevant information to include in the contextual view.

13. The system of claim 12, wherein the set of driving-context-relevant information comprises one or more gauges that are relevant to the one or more defined conditions associated with the contextual state.

14. The system of claim 12, wherein the set of driving-context-relevant information comprises one or more messages that are relevant to the one or more defined conditions associated with the contextual state.

15. The system of claim 12, wherein the set of driving-context-relevant information includes a gauge or message selected for inclusion by a driver of the vehicle.

16. The system of claim 10, wherein in displaying the set of driving-context-relevant information in the displayed instrument cluster, the system is configured to display the set of driving-context-relevant information according to user-configured settings.

17. The system of claim 10, wherein the contextual state is one of:
a highway/steady state;
a city state;
a night state;
a day state;
a standstill state;
a parking state;
a hill climb state;

a descent/downhill state;
a beginning trip state; or
an ending trip/approaching destination state.

18. A computer readable storage device including computer readable instructions, which when executed by a processing unit are configured to provide one or a combination of:
    displaying the instrument cluster in a first content view of a set of content views;
    receiving an indication of a user selection to change the displayed first content view to a contextual content view;
    receiving signaling data from a plurality of data sources, the signaling data including data about physical conditions experienced by the vehicle derived from sensor readings from sensors included on the vehicle;
    evaluating the signaling data to determine whether one of a plurality of predefined contextual states is associated with at least part of the signaling data,
    wherein each predefined contextual state has associated with it one or more signaling data inputs of the signaling data, each signaling data input being associated with a condition being experienced by the vehicle,
    wherein each predefined contextual state has associated with it context-relevant information, the context relevant information including one or more gauges;
    in response to inferentially determining that at least part of the signaling data is associated with one of the plurality of predefined contextual states, displaying the instrument cluster in the contextual view, wherein displaying the instrument cluster in the contextual view comprises displaying a set of driving-context-relevant information in the displayed instrument cluster based on the contextual state, the driving-context-relevant information including the context relevant information associated with the determined predefined contextual state; and
    displaying a message indicating the determined predefined contextual state.

19. The computer readable storage device of claim 18, wherein evaluating the signaling data comprises:
    determining whether one or a combination of signaling data values or a change in signaling data values correspond with one or more defined conditions; and
    in response to determining that one or a combination of signaling data values or a change in signaling data values correspond with one or more defined conditions, determining whether the one or more defined conditions are associated with the contextual state.

20. The computer readable storage device of claim 19, wherein in response to determining that the one or more defined conditions are associated with the contextual state:
    determining the set of driving-context-relevant information to include in the contextual view.

* * * * *